(12) United States Patent (10) Patent No.: US 8,412,864 B2
Kyusojin et al. (45) Date of Patent: Apr. 2, 2013

(54) INFORMATION PROCESSING APPARATUS AND INFORMATION PROCESSING METHOD

(75) Inventors: Hiroshi Kyusojin, Tokyo (JP); Hideki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 11/911,458

(22) PCT Filed: Apr. 6, 2006

(86) PCT No.: PCT/JP2006/307335
§ 371 (c)(1),
(2), (4) Date: Apr. 20, 2009

(87) PCT Pub. No.: WO2006/112270
PCT Pub. Date: Oct. 26, 2006

(65) Prior Publication Data
US 2009/0216914 A1 Aug. 27, 2009

(30) Foreign Application Priority Data
Apr. 13, 2005 (JP) ................................ 2005-115371

(51) Int. Cl.
*G06F 13/28* (2006.01)
(52) U.S. Cl. ........................................................ 710/22
(58) Field of Classification Search .................... 710/22
See application file for complete search history.

(56) References Cited

U.S. PATENT DOCUMENTS
5,708,779 A * 1/1998 Graziano et al. ............. 709/250
6,912,225 B1 6/2005 Kohzuki et al.
2004/0196788 A1 10/2004 Lodha
2005/0213570 A1 * 9/2005 Stacy et al. ................... 370/389
2007/0174511 A1 * 7/2007 Yu et al. .......................... 710/36

FOREIGN PATENT DOCUMENTS
EP 1 054 544 11/2000
JP 04-261245 9/1992
JP 08-249267 9/1996
(Continued)

OTHER PUBLICATIONS

Supplemental European Search Report for Application No. 06731283.5-2212, dated Mar. 27, 2009.
(Continued)

*Primary Examiner* — Henry Tsai
*Assistant Examiner* — Juanito Borromeo
(74) *Attorney, Agent, or Firm* — Finnegan Henderson Farabow Garrett & Dunner, L.L.P.

(57) ABSTRACT

The present invention relates to an information processing apparatus capable of accurately controlling DMA transfer of a plurality of pieces of data present in a memory with a simple hardware configuration, and an information processing method for use therewith. A memory 33 is provided with a descriptor table T0 corresponding to a queue Q0 and a descriptor table T1 corresponding to a queue Q1. In registers R0 and R1 of a descriptor controller 51, the descriptor number constituting the descriptor table T0 and the descriptor number constituting the descriptor table T1 are recorded, respectively. In caches C0 and C1 of a descriptor obtaining section 52, descriptors of the descriptor table T0 and descriptors of the descriptor table T1 are recorded, respectively. A descriptor selector 53 selects one of the caches C0 and C1 in accordance with a predetermined rule. The present invention can be applied to all electronic apparatuses for performing DMA transfer.

20 Claims, 9 Drawing Sheets

FOREIGN PATENT DOCUMENTS

| | | |
|---|---|---|
| JP | 08-429267 | 9/1996 |
| JP | 09-259071 | 10/1997 |
| JP | 11-296472 | 10/1999 |
| JP | 2000-332787 | 11/2000 |
| JP | 2001-282705 | 10/2001 |
| JP | 2003-281078 | 10/2003 |
| JP | 2004-110159 | 4/2004 |
| WO | WO 00/31647 | 6/2000 |

OTHER PUBLICATIONS

Communication from the Japan Patent Office in Japanese Patent Application No. 2005-115371, mailed Jan. 31, 2012 (10 pages, including translation).

* cited by examiner

FIG. 3

| DESCRIPTOR TABLE | DESCRIPTOR # 0 |
| | DESCRIPTOR # 1 |
| | DESCRIPTOR # 2 |
| | ⋮ |
| | DESCRIPTOR # n |

FIG. 4

| 31 | 0 |
|---|---|
| address(high) ||
| address(low) ||
| reserved | length |

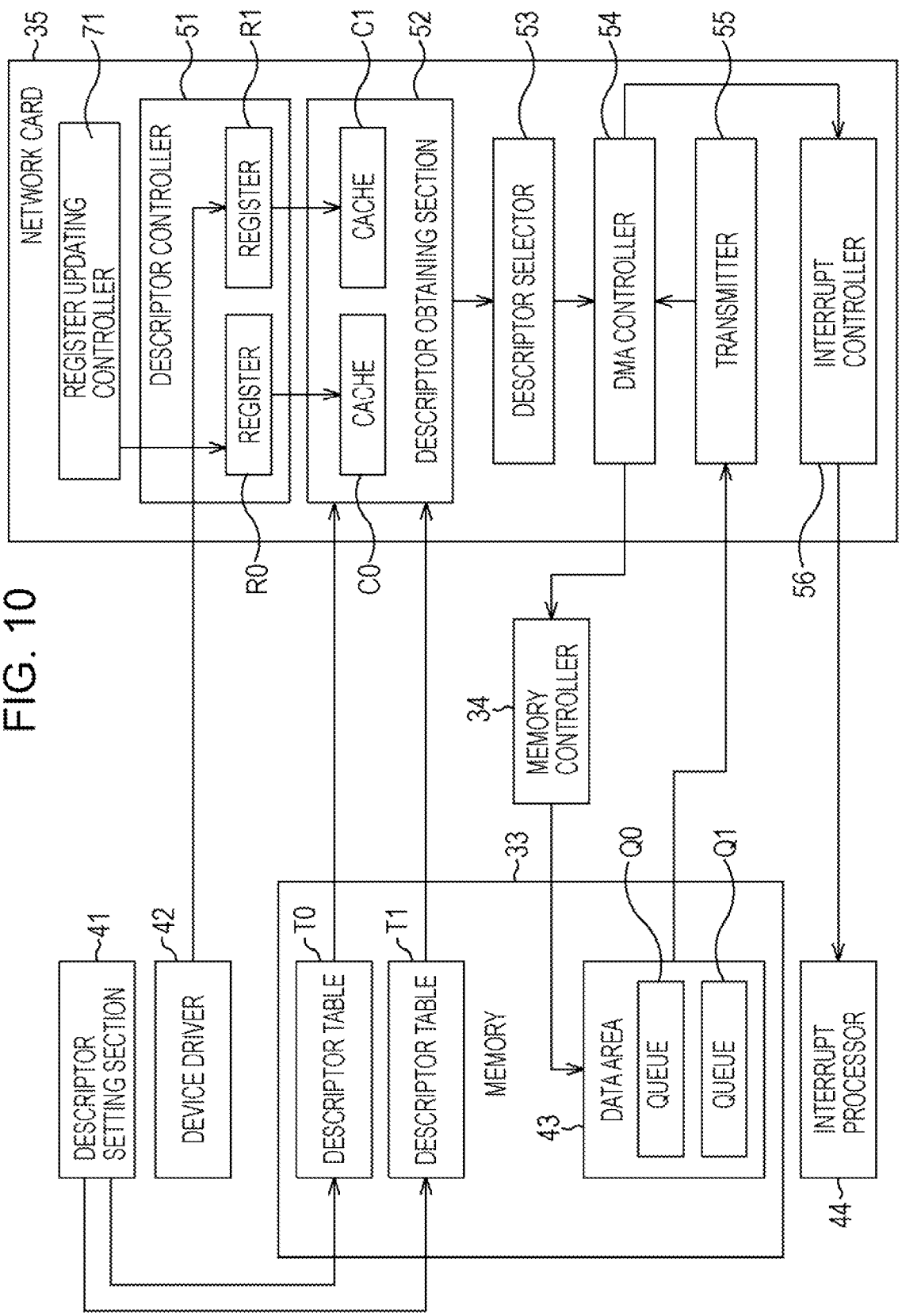

INFORMATION PROCESSING APPARATUS AND INFORMATION PROCESSING METHOD

TECHNICAL FIELD

The present invention relates to an information processing apparatus and an information processing method. More particularly, the present invention relates to an information processing apparatus suitably used to read data in a memory in accordance with DMA (Direct Memory Access) and to transmit the data via a network and to an information processing method for use therewith.

BACKGROUND ART

A system for transmitting data from a transmission apparatus to a receiving apparatus via a network is considered. FIG. 1 shows an example of the configuration of such a system.

A transmission apparatus 1 includes a CPU 11 for controlling the entire transmission apparatus 1 by executing a predetermined program, a memory 13 connected to the CPU 11 via a data bus 12, a memory controller 14, and a network card 15. Data (hereinafter referred to as "transmission data") to be transmitted to a receiving apparatus 3 has been stored in the memory 13. Usually, in order that the CPU 11 is not monopolized, the transmission data is read from the memory 13 in accordance with DMA (Direct Memory Access) and is moved, to the network card 15, and thereafter, the transmission data, is transmitted from the network, card 15 to the receiving apparatus 3 via a network 2.

A description will be given below, with reference to the flowchart in FIG. 2, of an operation for performing DMA transfer of transmission data recorded in the memory 13 into the network card 15. In step S1, the CPU 11 describes information on transmission data in packet units in each descriptor of a descriptor table provided in the memory 13.

FIG. 3 shows an example of a descriptor table. The descriptor table is composed of a plurality of descriptors #0 to #n recorded in consecutive areas of the memory 13. FIG. 4 shows the data structure of each descriptor. In the descriptor, an "address (high)" indicating high-order 32 bits of the recording start address of a corresponding packet in the memory 13, an "address (low)" indicating low-order 32 bits thereof, an unused 16-bit "reserved", and a 16-bit "length" indicating a packet length are described.

Referring back to FIG. 2, in step S2, the CPU 11 notifies the network card 15 of the descriptor number that has become usable (that is, in which information in packet units is described in the process of step S1).

In step S3, in response to this notification, the network card 15 reads usable descriptors one by one from the memory 13. Then, in step S4, the network card 15 notifies the memory controller 14 of the recording start address and the packet length described in the descriptor. In response to this notification, the memory controller 14 transfers the data of such a packet length with the recording start address denoting a beginning of the memory 13 from the memory 13 to the network card 15 in accordance with DMA. The network card 15 transmits the DMA-transferred packets to the receiving apparatus 3 via the network 2. As a result of the processing of steps S3 and S4, one packet of the transmission data is moved to the network card 15 and is transmitted to the receiving apparatus 3.

In step S5, the network card 15 determines whether or not there is a descriptor that has not yet been read among the usable descriptors. When it is determined that there is a descriptor that has not yet been read, the process returns to step S3, and processing of step S3 and subsequent steps is repeated. When it is determined in step S5 that all the descriptors have been read, all the packets constituting the transmission data are moved to the network card 15 and are transmitted to the receiving apparatus 3. As a consequence, the process proceeds to step S6. In step S6, the network card 15 notifies the CPU 11 of the completion of the DMA. In step S7, the CPU 11 frees up the space in the memory 13 in which the transmission data had been recorded. This completes the description of the operation for performing DMA transfer from the memory 13 to the network card 15.

Next, an operation is considered in which a plurality of pieces of data in the memory 13 are DMA-transferred to the network card 15 in accordance with their respective priorities, a plurality of pieces of data are transmitted from the network card 15 via the network 2. In order to implement the above operation, there is a method in which a plurality of queues are provided in the memory 13, transmission data that is stored in each of them is DMA-transferred to the network card 15, and the transmission data is transmitted from the network card 15 via the network 2 (refer to, for example, Patent Document 1).

It is assumed that, for example, a first queue and a second queue having different transmission rates and different priorities are provided in the memory 13; first transmission data that should be transmitted at a first transmission rate is stored in the first queue, and second transmission data that should be transmitted at a second transmission rate is stored in the second queue.

In order to DMA-transfer the first data stored in the first queue and the second data stored in the second queue, two methods have been proposed.

A first method is a method in which a descriptor corresponding to a first queue or a second queue is alternately described in accordance with the corresponding transmission rate or priority, and thereby first data and second data are DMA-transferred at time division. A second method is a method in which two or more DMA channels are provided, between the memory 13 and the network card 15 (refer to, for example, Patent Document 2).

[Patent Document 1] Japanese Unexamined Patent Application Publication No. 2000-332787

[Patent Document 2] Japanese Unexamined Patent Application Publication No. 9-259071

DISCLOSURE OF INVENTION

In the above-described first method, since descriptors corresponding to the first queue and the second queue need to be alternately described in accordance with the transmission rates and the priorities of the first queue and the second queue, respectively, the burden of the CPU 11 becomes large. Furthermore, since the granularity (time intervals when timing of operation is controlled) of the processing of the CPU 11 that operates in accordance with software is larger than that of the network card 15 that is hardware, it is difficult to alternately describe descriptors to a degree such that they can be used to accurately control a transmission rate.

In the above-described second method, first data and second data, can be DMA-transferred from the memory 13 to the network card 15 in parallel at the same time. However, when two or more DMA channels are provided between the memory 13 and the network card 15, the hardware configuration of the network card 15 and the like becomes complex, presenting problems that the circuit size becomes large and the manufacturing cost increases.

The present invention has been made in view of such circumstances. The present invention seeks to be capable of accurately controlling DMA transfer of a plurality of pieces of data present in a memory with a simple hardware configuration.

Means for Solving the Problems

An information processing apparatus according to the present invention includes generation means for generating groups of descriptors in such a manner as to each correspond to a queue, the groups of descriptors being configured in such a manner that descriptors for reading data in packet units from the queues lie one after another; reading means for reading a descriptor from each of a plurality of groups of descriptors generated in such a manner as to each correspond to one of the queues by the generation means; selection means for selecting one of the plurality of descriptors read by the reading means; and DMA means for extracting position information from the descriptor selected by the selection means and for reading data in packet units from the memory in accordance with DMA on the basis of the extracted position information.

Each of the groups of descriptors may be a descriptor table in which a plurality of descriptors are consecutively arranged physically.

Each of the groups of descriptors may be a descriptor chain in which the plurality of descriptors are arranged discretely, and information indicating the position information of a descriptor that follows is described in each of the descriptors.

The selection means may select with a higher priority a descriptor corresponding to a predetermined queue among the plurality of descriptors read by the reading means.

The information processing apparatus may further include control means for controlling a timing at which the descriptor is read by the reading means.

The generation means may be implemented by software, and the control means may be implemented by hardware.

An information processing method according to the present invention includes: a generation step of generating groups of descriptors in such a manner as to each correspond to a queue, the groups of descriptors each being configured in such a manner that descriptors for reading data in packet units from the queues lie one after another; a reading step of reading a descriptor from each of a plurality of groups of descriptors each generated in such a manner as to correspond to one of the queues in the process of the generation step; a selection step of selecting one of the plurality of descriptors read in the process of the reading step; and a DMA step of extracting position information from the descriptor selected in the process of the selection step and of reading data in packet units from the memory in accordance with DMA on the basis of the extracted position information.

In the present invention, groups of descriptors are generated in such a manner as to correspond to each queue, the group of descriptors being configured in such a manner that descriptors for reading data in packet units from the queues lie one after another. A descriptor is read from each of a plurality of generated groups of descriptors. One of the plurality of descriptors is selected. On the basis of position information extracted from the selected descriptor, data in packet units is read from the memory in accordance with DMA.

Advantages

According to the present invention, it is possible to accurately control DMA transfer of a plurality of pieces of data present in a memory with a simple hardware configuration.

BRIEF DESCRIPTION OF THE DRAWINGS

FIG. 3 snows an example of a descriptor table composed of a plurality of descriptors.

FIG. 4 shows the data structure of a descriptor used for DMA.

FIG. 10 is a block diagram showing function blocks implemented by the CPU of FIG. 5 and another example of the configuration of a network card.

Figure 1:
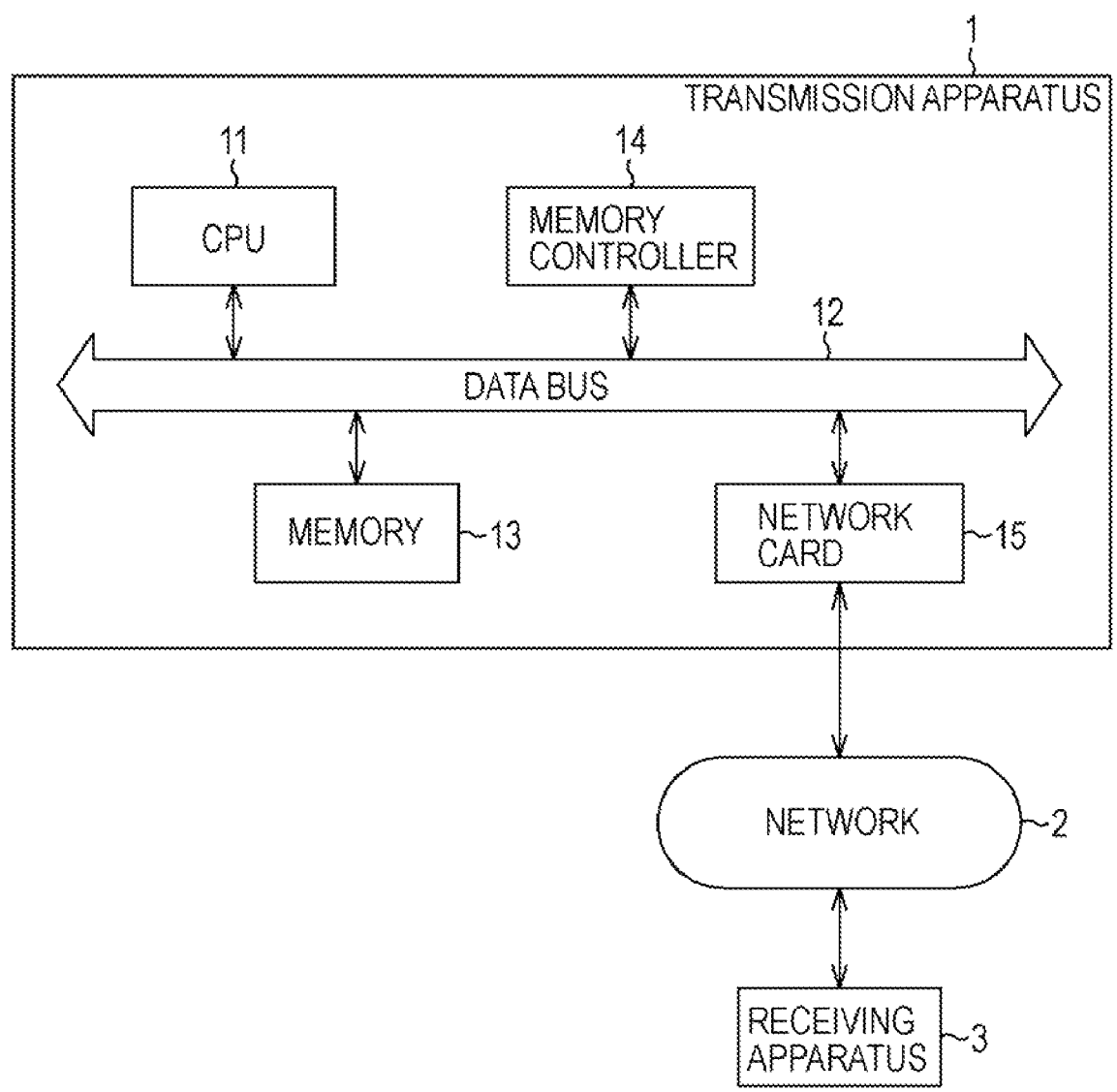
FIG. 1 shows an example of a system in which data is transmitted and received via a network.
Figure 2:
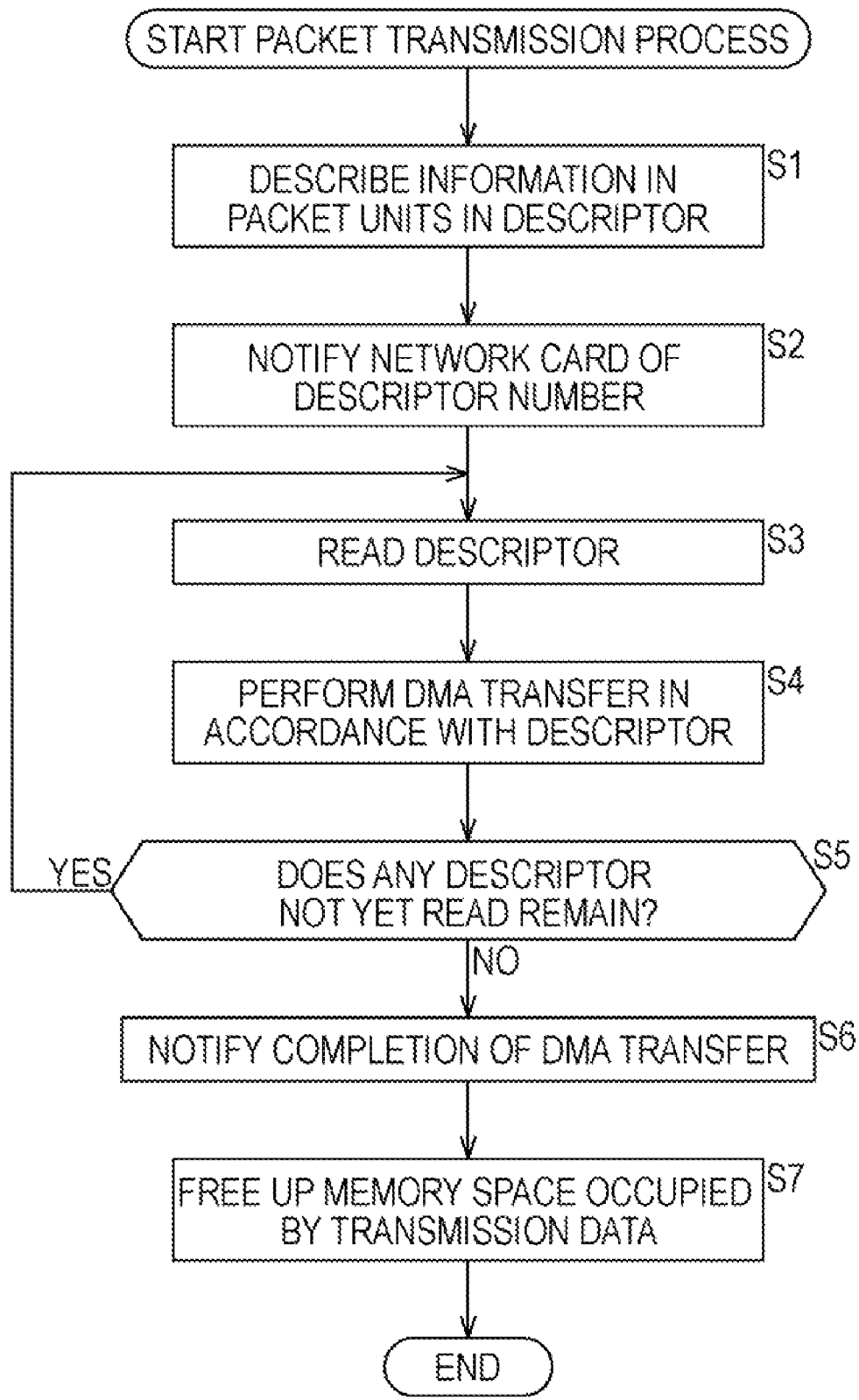
FIG. 2 is a flowchart illustrating an operation by an transmission apparatus of FIG. 1.

REFERENCE NUMERALS 2 network, 3 receiving apparatus, 30 transmission apparatus, 31 CPU, 32 data bus, 33 memory, 34 memory controller, 35 network card, 36 program, 41 descriptor setting section, 42 device driver, 44 interrupt processor, 51 descriptor controller, 52 descriptor obtaining section, 53 descriptor selector, 54 DMA controller, 55 transmitter, 56 interrupt controller, 71 register updating controller

BEST MODE FOR CARRYING OUT THE INVENTION

Specific embodiments to which the present invention is applied will be described below in detail with reference to the drawings.

Figure 5:
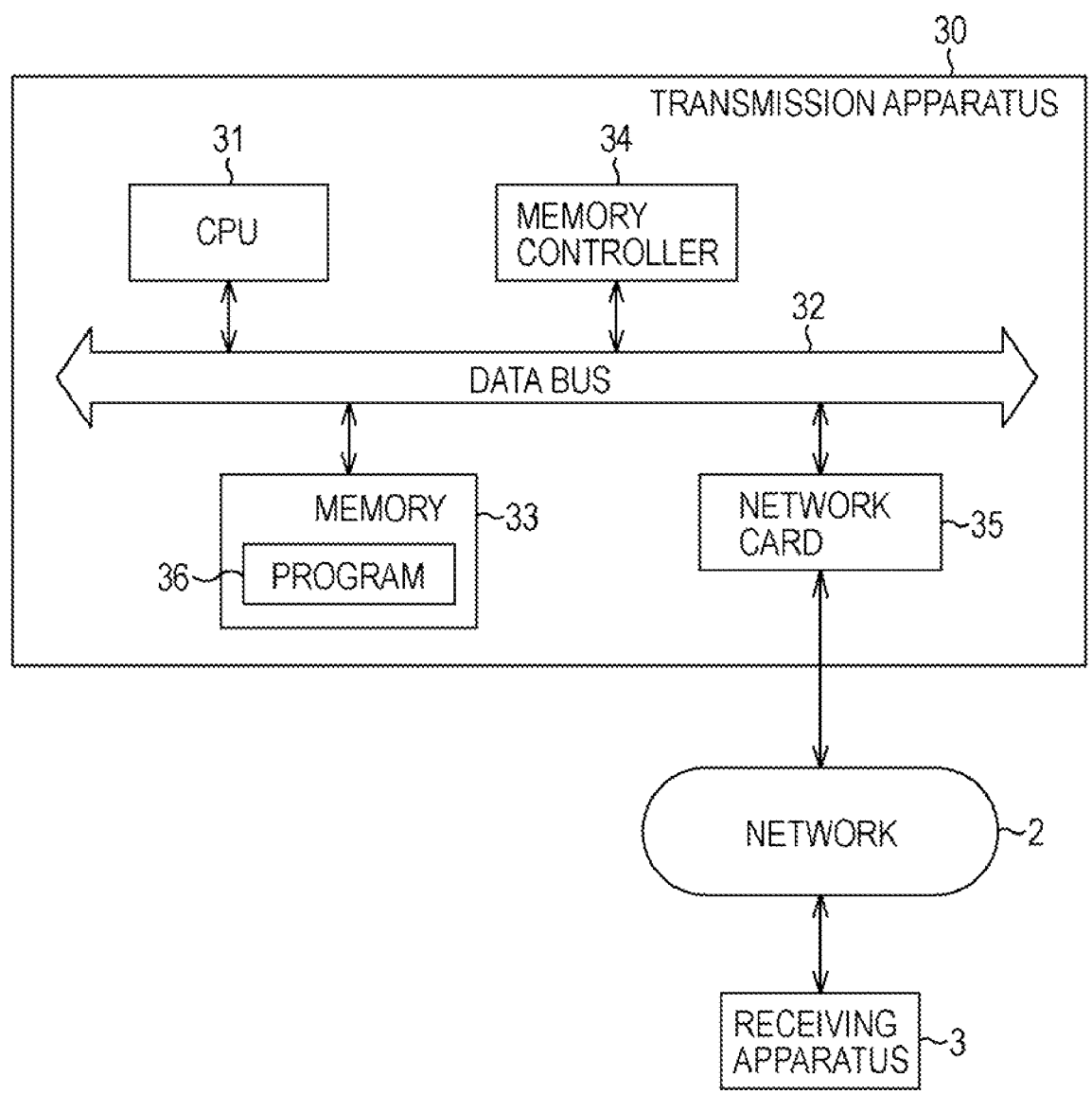
FIG. 5 is a block diagram showing an example of the configuration of a transmission apparatus to which the present invention is applied.

FIG. 5 shows an example of the configuration of a transmission apparatus according to an embodiment of the present invention. A transmission apparatus 30 transmits a plurality of pieces of transmission data recorded (or stored) in an incorporated memory 33 to the receiving apparatus 3 via the network 2 in such a manner as to correspond to a transmission rate and a priority that are set in each piece of transmission data.

Figure 6:
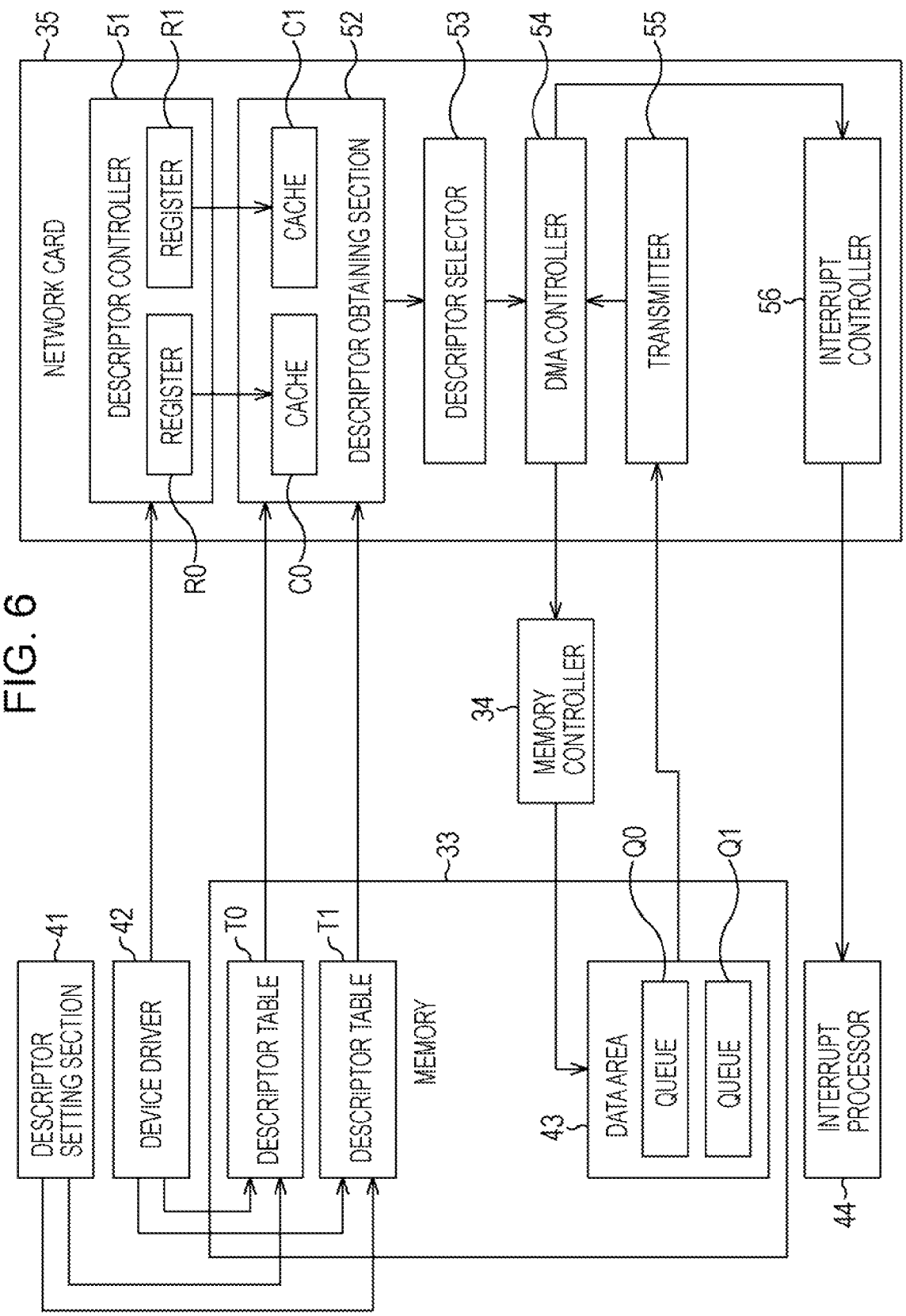
FIG. 6 is a block diagram showing function blocks implemented by a CPU of FIG. 5 and an example of the configuration of a network card.

The transmission apparatus 30 includes a CPU 31 for implementing functions (a descriptor setting section 41, a device driver 42, and an interrupt processor 44) shown in FIG. 6 by executing a program 36 recorded in the memory 33, the memory 33, a memory controller 34, and a network card 35, the memory 33, the memory controller 34, and the network card 35 being connected to the CPU 31 via a data bus 32.

In the memory 33, the program 36 (including a device driver program for controlling the network card 35) to be executed by the CPU 31 has been recorded. In a data area 43 (FIG. 6) of the memory 33, a plurality of queues (in this case, queues Q0 and Q1) are provided.

In each of the queues Q0 and Q1, data to be transmitted is recorded. In the queue Q0, data to be transmitted with a higher priority is recorded. Hereinafter, data recorded in the queue Q0 is described as transmission data DQ0, and data recorded in the queue Q1 is described as transmission data DQ1.

Furthermore, the memory 33 is provided with a plurality of descriptor tables (in this case, descriptor tables T0 and T1) corresponding to the number of queues.

On the basis of the recording start address "address" and the packet length "length" notified from the network card 35, the memory controller 34 transfers transmission data recorded in the memory 33 in packet units to the network card 35 in accordance with DMA.

The network card 35 reads a descriptor described in the memory 33 by the CPU 31, controls the memory controller 34 in accordance with the read descriptor, thereby obtains transmission data in packet units in accordance with DMA transfer, and transmits the transmission data to the receiving apparatus 3 via the network 2.

FIG. 6 shows function blocks implemented by the CPU 31 by executing the program 36 and an example of the configuration of the network card 35.

The descriptor setting section 41, the device driver 42, and the interrupt processor 44, which are function blocks, are implemented by the CPU 31 by executing the program 36.

Figure 7:
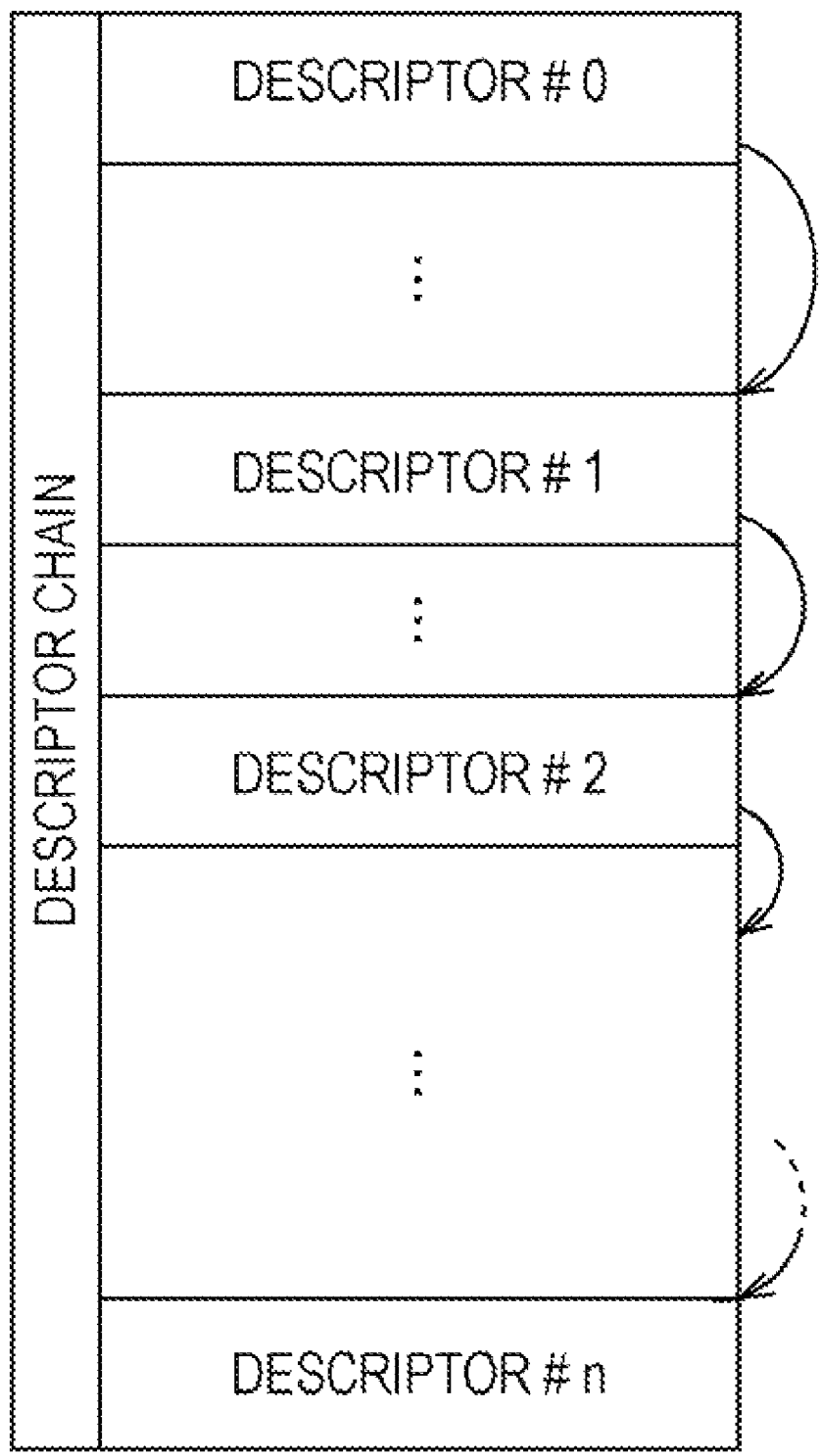
FIG. 7 shows an example of a descriptor chain in place of a descriptor table.
Figure 8:
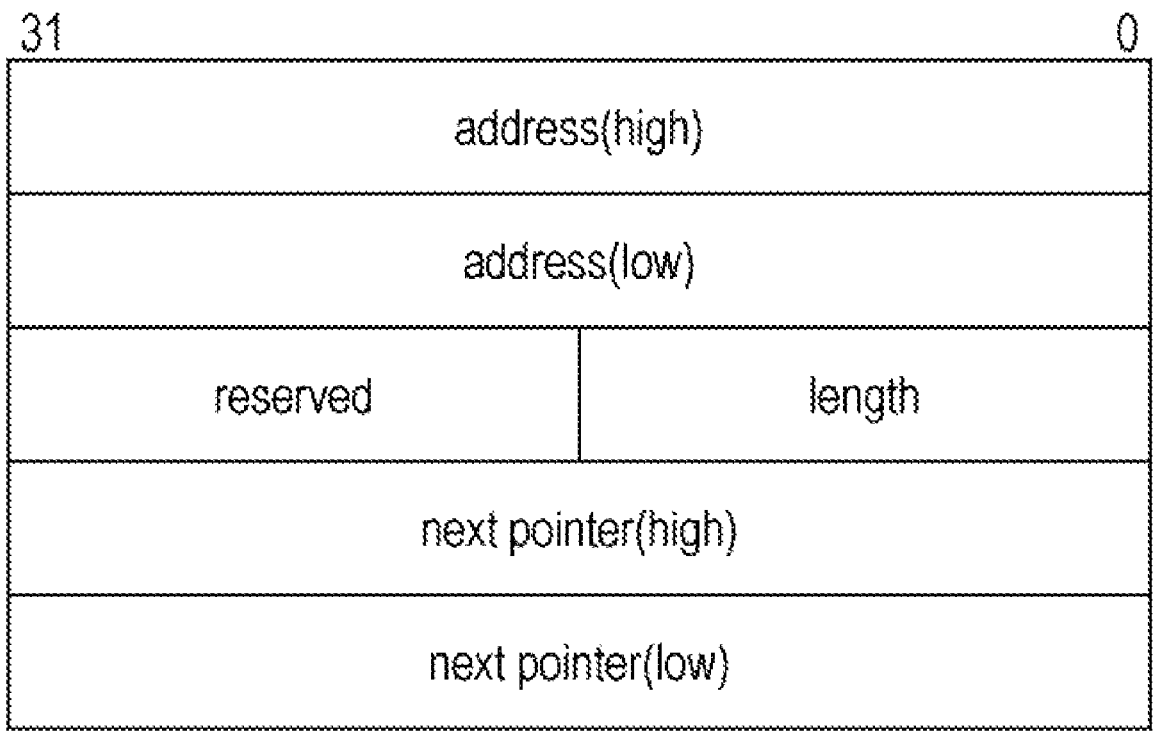
FIG. 8 shows the data structure of a descriptor constituting the descriptor chain.

The descriptor setting section 41 describes information on the transmission data DQ0 in packet units in each descriptor constituting the descriptor table T0 provided in the memory 33, and describes information on the transmission data DQ1 in packet units in each descriptor constituting the descriptor table T1. At this point, as shown in FIG. 4, information in packet units refers to an "address (high)" indicating high-order 32 bits of the recording start address of a packet in the memory 13, an "address (low)" indicating low-order 32 bits thereof, and a 16-bit "length" indicating a packet length, As shown in FIG. 3, the descriptor tables T0 and T1 are composed of a plurality of descriptors arranged consecutively. However, in place of the descriptor tables T0 and T1, a descriptor chain composed of a plurality of descriptors arranged, discretely as shown in FIG. 7 may be used. However, as shown in FIG. 8, in each descriptor constituting the descriptor chain, following an "address (high)" indicating high-order 32 bits of the recording start address of the packet in the memory 13, an "address (low)" indicating low-order 32 bits thereof, and a 16-bit "length" indicating a packet length, a "next pointer (high)" indicating high-order 32 bits of the recording start address of the next descriptor, a "next pointer (low)" indicating low-order 32 bits thereof are added.

Referring back to FIG. 6, the device driver 42 notifies the descriptor controller 51 of the network card 35, of the descriptor number that has become usable, that is, the descriptor described by the descriptor setting section 41.

When the interrupt processor 44 is notified of the completion of the DMA from the interrupt controller 56 of the network card 35, the interrupt processor 44 performs a predetermined interrupt process (a process for freeing up the queues Q0 and Q1).

On the other hand, the network card 35 includes a descriptor controller 51, a descriptor obtaining section 52, a descriptor selector 53, a DMA controller 54, a transmitter 55, and an interrupt controller 56.

The descriptor controller 51 has incorporated therein registers R0 and R1. The descriptor controller 51 records, in the register R0, the descriptor number constituting the descriptor table T0 among the numbers of the usable descriptors that are notified from the device driver 42, and records the descriptor number constituting the descriptor table T1 in the register R1.

The descriptor obtaining section 52 has incorporated therein caches C0 and C1. On the basis of the number recorded in the register R0 of the descriptor controller 51, the descriptor obtaining section 52 obtains a usable descriptor from the descriptor table T0 provided in the memory 33, and records the descriptor in the cache C0. Furthermore, on the basis of the number recorded in the register R1 of the descriptor controller 51, the descriptor obtaining section 52 obtains a usable descriptor from the descriptor table T1 provided in the memory 33, and records the descriptor in the cache C1.

The descriptor selector 53 selects one of the caches C0 and C1 of the descriptor obtaining section 52 in accordance with a predetermined rule, reads the descriptor recorded in the selected cache, and outputs the descriptor to the DMA controller 54. The cache C0 or C1 from which the descriptor is read is cleared by the descriptor obtaining section 52. In this case, the predetermined rule stipulates that data to be transmitted with a higher priority is recorded in the queue Q0. Therefore, for example, when the descriptor has been recorded in the cache C0, the cache C0 is selected, and the cache C1 is selected only when the descriptor has not been recorded in the cache C0.

The DMA controller 54 reads the recording start address "address" and the packet length "length" described in the descriptor input from the descriptor selector 53, and notifies the memory controller 34 of them so as to request the memory controller 34 to perform DMA. Furthermore, when the DMA controller 54 receives a notification of the fact that there is no usable descriptor from the descriptor obtaining section 52 and receives a notification indicating the completion of the DMA based on the final usable descriptor, the DMA controller 54 notifies the interrupt controller 56 of the fact that the DMA has been completed.

The transmitter 55 transmits transmission data in packet units, which is transferred from a memory 45 in accordance with DMA in response to control by the memory controller 34, to the receiving apparatus 3 via the network 2. When the interrupt controller 56 receives a notification indicating the completion of the DMA from the DMA controller 54, the interrupt controller 56 notifies the interrupt processor 44 of the fact that the DMA has been completed.

Figure 9:
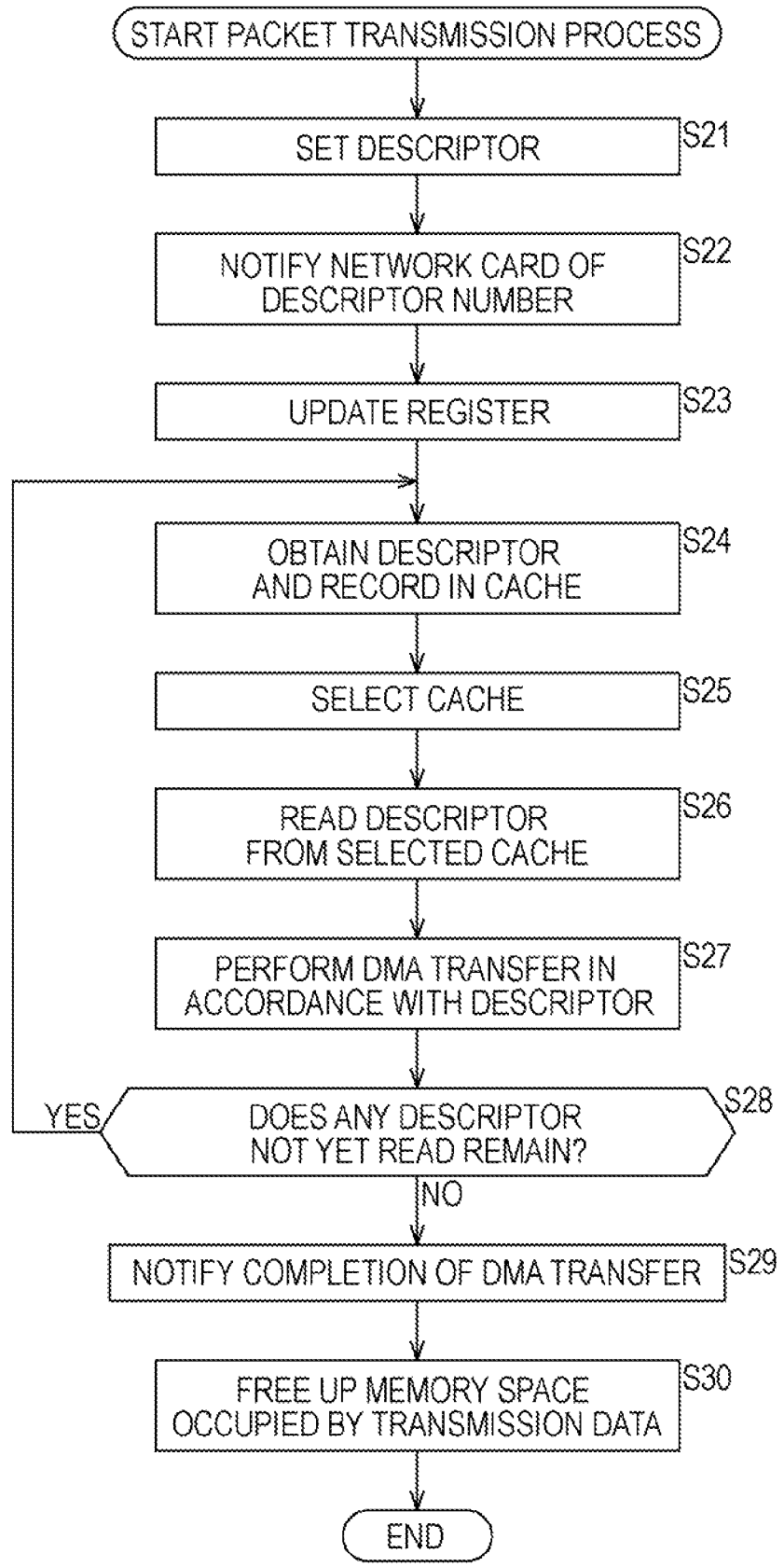
FIG. 9 is a flowchart illustrating a packet transmission process by the transmission apparatus of FIG. 5.

Next, a description will be given, with reference to the flowchart in FIG. 9, of a packet transmission process performed by the transmission apparatus 30. It is assumed that transmission data DQ0 and DQ1 have been recorded in the queues Q0 and Q1 provided in the memory 33 in response to a request from a user, respectively. It is also assumed that the registers R0 and R1 and the caches C0 and C1 have been cleared.

In step S21, on the basis of the transmission data DQ0 recorded in the queue Q0, the descriptor setting section 41 describes information on the transmission data DQ0 in packet units in each descriptor of the descriptor table T0 provided in the memory 33, and on the basis of the transmission data DQ1 recorded in the queue Q1, the descriptor setting section 41 describes information on the transmission data DQ1 in packet units in each descriptor of the descriptor table T1 provided in the memory 33. When the transmission data DQ0 does not exist in the queue Q0, the descriptors of the descriptor table T0 are not described, and when the transmission data DQ1 does not exist in the queue Q1, the descriptors of the descriptor table T1 are not described.

In step S22, the device driver 42 notifies the descriptor controller 51 of the network card 35, of the descriptor number that has become usable, that is, the descriptor described by the descriptor setting section 41 in the process of step S21. In step S23, the descriptor controller 51 updates the value of the register R0 by using the descriptor number usable in the descriptor table T0 among the numbers of the descriptors notified from the device driver 42, and updates the value of the register R1 by using the number of the usable descriptor in the descriptor table T1.

In step S24, on the basis of the number recorded in the register R0, the descriptor obtaining section 52 obtains a descriptor that can be used from the descriptor table T0 and records it in the cache C0. On the basis of the number recorded in the register R1, the descriptor obtaining section 52 obtains a descriptor that can be used from the descriptor table T1 and records it in the cache C1. When descriptors have already been recorded in the caches C0 and C1 and have not been read, obtaining of the descriptor is not performed.

In step S25, the descriptor selector 53 selects one of the caches C0 and C1 of the descriptor obtaining section 52, reads the descriptor recorded in the selected cache, and outputs it to the DMA controller 54. The selection rule stipulates that, for example, when a descriptor has been recorded in the cache C0, the cache C0 is used with a higher priority.

In step S26, the descriptor selector 53 reads a descriptor from the selected cache C0 or C1, and outputs it to the DMA controller 54. The descriptor obtaining section 52 clears the cache C0 or C1 from which the descriptor has been read. In step S27, the DMA controller 54 reads the recording start address "address" and the packet length "length" described in the descriptor input from the descriptor selector 53 and notifies of the memory controller 34 of them in order to request for DMA to be performed. In response to this, the memory controller 34 transfers data for the amount of the packet length "length" from the notified recording start address "address" of the memory 33 to the transmitter 55 in accordance with DMA. The transmitter 55 transmits DMA-transferred transmission data DQ0 or DQ1 in packet units to the receiving apparatus 3 via the network 2.

In step S28, the descriptor obtaining section 52 determines whether or not any descriptor not yet obtained remains among the descriptors corresponding to the numbers stored in the registers R0 and R1. When it is determined that a descriptor not yet obtained remains, the process returns to step S24, and processing of step S24 and subsequent steps is repeated. When it is determined that a descriptor not yet obtained does not remain, the process proceeds to in step S29. In step S29, the DMA controller 54 notifies the interrupt controller 56 of the fact that the DMA has been completed. In response to this notification, the interrupt controller 56 notifies the interrupt processor 44 of the fact that the DMA has been completed. In step S30, in response to the notification, the interrupt processor 44 performs a predetermined interrupt process (a process for freeing up the queues Q0 and Q1, and the like). In practice, in response to the notification from the interrupt controller 56, a program for implementing the interrupt processor 44 is started up, and a predetermined interrupt process is performed. This completes the description of the packet transmission process by the transmission apparatus 30.

According to the packet transmission process that has been described thus far, the transmission data DQ0 recorded in the queue Q0 of the memory 33 can be DMA-transferred to the network card 35 with a priority higher than that of the transmission data DQ1 recorded in the queue Q1 of the memory 33, and can be transmitted via the network 2.

Naturally, if the rule for selecting one of the caches C0 and C1 in step S25 is changed, it is also possible to transmit the transmission data DQ1 recorded in the queue Q1 of the memory 33 with a higher priority.

Since descriptors are described in packet units, even when the packet length is not fixed, that is, when transmission data composed of variable-length packets is to be transmitted, the packet transmission process can be used.

Next, FIG. 10 shows function blocks implemented by the CPU 31 by executing the program 36 and another example of the configuration of the network card 35. In the example of the configuration, for the purpose of adjusting the intervals of the DMA transfer from the queue Q0 in order to control the transmission rate at which the transmission data DQ0 is transmitted via the network 2, a register updating controller 71 is added to the example of the configuration shown in FIG. 6. Components other than the register updating controller 71 are the same as those of FIG. 6 and are designated with the same reference numerals, and accordingly, descriptors thereof are omitted.

It is assumed that the transmission data DQ0 is recorded at a predetermined address in the queue Q0, and information indicating a predetermined address in the queue Q0 and a predetermined packet length is recorded in advance in each descriptor of the descriptor table T0.

The register updating controller 71 updates the number (indicating the usable descriptor in the descriptor table T0) recorded in the register R0 of the descriptor controller 51 at a predetermined period. The other register R1 is updated by the descriptor controller 51 in response to a notification from the device driver 42. The register updating controller 71 for updating the register R0 is hardware, and the device driver 42 for making a notification that serves as a trigger to update the register R1 is software. Therefore, the updating of the register R0 is controlled more accurately than the updating of the register R1. Therefore, since the intervals of the DMA transfer of the transmission data DQ0 recorded in the queue Q0 can be adjusted, it is possible to stabilize the transmission rate at which the transmission data DQ0 is transmitted via the network 2, and it is possible to prevent the transmission data DQ0 from being transmitted in a burst manner, that is, so-called traffic shaping can be implemented, For example, when the transmission data DQ0 is image data of 30 fps (flames per second) and data for one packet corresponding to one frame is stored at a predetermined address in the queue Q0 every $\frac{1}{30}$ second, if the register updating controller 71 updates the value (the descriptor number to be read) of the register R0, each time the transmission data DQ0 is additionally recorded in the queue Q0, an added packet can be DMA-transferred to the network card 35 and can be transmitted at a stable transmission rate from the network card 35 via the network 2.

The invention claimed is:

1. An information processing apparatus for reading data in packet units from a plurality of queues provided in a memory in accordance with DMA (Direct Memory Access), the information processing apparatus comprising:

generation means for generating groups of descriptors associated with corresponding ones of the queues;

means for assigning, to corresponding registers, values identifying the descriptors within the generated descriptor groups, the registers being associated with corresponding ones of the queues;

reading means for obtaining descriptors from the descriptor groups based on corresponding register values, the obtained descriptors identifying data associated with corresponding ones of the queues;

DMA means for extracting position information from a selected one of the descriptors and for reading data in packet units from the memory in accordance with DMA on the basis of the extracted position information, wherein an interrupt processor performs a predetermined interrupt process when the interrupt processor is notified of the completion of the DMA from an interrupt controller; and transmission means for transmitting a plurality of pieces of transmission data in such a manner as to correspond to a transmission rate and a priority that are set in each piece of transmission data, wherein:

the means for assigning comprises (i) a first means for assigning values to a first one of the registers associated with a corresponding first queue, and (ii) a second means for assigning values to a second one of the registers associated with a corresponding second queue, a priority of data associated with the first queue exceeding a priority of data associated with the second queue;

the first assigning means comprises a hardware controller configured to assign the values to the first register at predetermined intervals; and the second assigning means assigns the values to the second register in response to information indicating the generation of a descriptor group associated with the second queue.

2. The information processing apparatus according to claim 1, wherein the groups of descriptors are associated with corresponding descriptor tables in which a plurality of descriptors are consecutively arranged physically.

3. The information processing apparatus according to claim 1, wherein the groups of descriptors are associated with corresponding descriptor chains in which the plurality of descriptors are arranged discretely, and information indicating the position information of a subsequent descriptor is included within each of the descriptors.

4. The information processing apparatus according to claim 1, further comprising selection means for selecting the descriptor, wherein the selection means is configured to select a descriptor associated with a predetermined one of the queues, the predetermined queue having a priority that exceeds priorities associated with at least one of the other queues.

5. The information processing apparatus according to claim 1, further comprising control means for controlling a timing at which the descriptor is read by the reading means.

6. The information processing apparatus according to claim 1, wherein the generation means is implemented by software, and the control means is implemented by hardware.

7. An information processing method for use with an information processing apparatus for reading data in packet units from a plurality of queues provided in a memory in accordance with DMA (Direct Memory Access), the information processing method comprising:

generating groups of descriptors associated with corresponding ones of the queues;

assigning, to corresponding registers, values identifying the descriptors within the generated descriptor groups, the registers being associated with corresponding ones of the queues;

obtaining descriptors from the descriptor groups based on corresponding register values, the obtained descriptors identifying data associated with corresponding ones of the queues;

extracting position information from a selected one of the descriptors and reading data in packet units from the memory in accordance with DMA on the basis of the extracted position information, wherein an interrupt processor performs a predetermined interrupt process when the interrupt processor is notified of the completion of the DMA from an interrupt controller; and transmitting a plurality of pieces of transmission data in such a manner as to correspond to a transmission rate and a priority that are set in each piece of transmission data, wherein the assigning comprises:

assigning, using a hardware controller, values to a first one of the registers associated with a corresponding first queue at predetermined intervals; and assigning values to a second one of the registers associated with a corresponding second queue in response to information indicating the generation of a descriptor group associated with the second queue, a priority of data associated with the first queue exceeding a priority of data associated with the second queue.

8. The information processing apparatus of claim 1, wherein the descriptors in corresponding descriptors groups are arranged in a manner that facilitates access to consecutive packet units of data.

9. The information processing apparatus of claim 1, wherein the reading means comprises means for storing the obtained descriptors in corresponding caches, the caches being associated with corresponding ones of the queues.

10. The information processing apparatus of claim 9, further comprising means for clearing at least one of (i) the register values or (ii) the caches upon transmission of the transmission data pieces.

11. The information processing apparatus of claim 1, wherein the second assigning means comprises a software-based driver executed by at least one processor.

12. The method of claim 7, wherein the groups of descriptors are associated with corresponding descriptor tables in which a plurality of descriptors are consecutively arranged physically.

13. The method of claim 7, wherein the groups of descriptors are associated with corresponding descriptor chains in which the plurality of descriptors are arranged discretely, and information indicating the position information of a subsequent descriptor is included within each of the descriptors.

14. The method of claim 7, further comprising selecting the descriptor, the selected descriptor being associated with a predetermined one of the queues, the predetermined queue having a priority that exceeds priorities associated with at least one of the other queues.

15. The method of claim 7, further comprising controlling a timing at which the descriptor is obtained by the obtaining means.

16. The method of claim 7, wherein the descriptors in corresponding descriptors groups are arranged in a manner that facilitates access to consecutive packet units of data.

17. The method of claim 7, wherein the obtaining comprises storing the obtained descriptors in corresponding caches, the caches being associated with corresponding ones of the queues.

18. The method of claim 17, further comprising clearing at least one of (i) the register values or (ii) the caches upon transmission of the transmission data pieces.

19. The method of claim 7, wherein assigning the values to the second register comprising assigning the values to the second register using a software-based driver executed by at least one processor.

20. A tangible, non-transitory computer-readable medium storing instructions that, when executed by at least one processor, cause the at least one processor to perform a method for use with an information processing apparatus for reading data in packet units from a plurality of queues provided in a memory in accordance with DMA (Direct Memory Access), the method comprising:

generating groups of descriptors associated with corresponding ones of the queues;

assigning, to corresponding registers, values identifying the descriptors within the generated descriptor groups, the registers being associated with corresponding ones of the queues;

obtaining descriptors from the descriptor groups based on corresponding register values, the obtained descriptors identifying data associated with corresponding ones of the queues;

extracting position information from a selected one of the descriptors and reading data in packet units from the memory in accordance with DMA on the basis of the extracted position information, wherein an interrupt processor performs a predetermined interrupt process when the interrupt processor is notified of the completion of the DMA from an interrupt controller; and transmitting a plurality of pieces of transmission data in such a manner as to correspond to a transmission rate and a priority that are set in each piece of transmission data, wherein the assigning comprises:

assigning, using a hardware controller, values to a first one of the registers associated with a corresponding first queue at predetermined intervals; and assigning values to a second one of the registers associated with a corresponding second queue in response to information indicating the generation of a descriptor group associated with the second queue, a priority of data associated with the first queue exceeding a priority of data associated with the second queue.

* * * * *